3,466,303
N,N-DIALKYLTRIDECYLAMINE SALTS OF 3,6-ENDOXOHEXAHYDROPHTHALIC ACID
Harold Miller, Newtown Square, Pa., and Russell Nelson, Tacoma, Wash., assignors to Pennsalt Chemicals Corporation, Philadelphia, Pa., a corporation of Pennsylvania
No Drawing. Original application Oct. 1, 1965, Ser. No. 492,331, now Patent No. 3,321,294. Divided and this application Dec. 13, 1966, Ser. No. 618,558
Int. Cl. C07d 5/32; A01n 9/28
U.S. Cl. 260—347.3   4 Claims

ABSTRACT OF THE DISCLOSURE

Di-lower-alkyltridecylamine salts of 3,6-endoxohexahydrophthalic acid where the amine has the formula

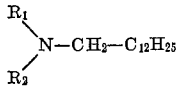

and where $R_1$ and $R_2$ are lower alkyl radicals and where the $C_{12}H_{25}$ moiety is branched useful as a pre-emergent herbicide.

---

This application is divisional application of Ser. No. 492,331, filed Oct. 1, 1965, now U.S. Pat. 3,321,294, which is a continuation-in-part of application Ser. No. 224,510, filed Sept. 18, 1962, now abandoned.

This invention relates to a novel class of compounds which are extremely effective in evoking plant growth responses. More particularly this invention deals with a specific type N,N-dialkyltridecylamine salt of endothal and its use as a pre-emergent herbicide.

It is known that numerous amines and their salts evoke response effects when applied to plant life. However, it has now been found that certain specific N,N-dialkyltridecylamine salts of endothal have a surprising and remarkably large effect.

The N,N-dialkyltridecylamine useful in this invention has a structure

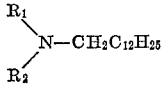

where $R_1$ and $R_2$ are lower alkyl groups; e.g. alkyl groups containing 1 to 4 carbon atoms and where the —$C_{12}H_{25}$ moiety is branched. The alkyltridecylamines used in this invention will preferably be derived from tridecyl alcohol made by the oxo process. This process is well known in the art and is described in the book "Higher Oxo Alcohols" published 1957 by Enjay Company, Inc. (Library of Congress, Catalog Card Number 57–13148). Page 33 of that text describes in detail the tridecyl alcohol from which the amines used in this invention are preferably derived. The oxo alcohol is converted to the amine by reaction with a di-lower alkylamine (e.g. dimethylamine) under conditions of heat and pressure in the presence of alumina as a catalyst as described in U.S. 2,043,965, whereby the dialkyltridecylamine is obtained. The structure of the amine is in accord with oxo reaction products in that the long chain alkyl group attached to the nitrogen atom is attached by a primary carbon (that is, —$CH_2$—N), but the long chain alkyl group is a branched chain radical. This structure of the amine is due to the fact that the oxo process always results in a major proportion of branched chain products being obtained. Thus, oxo-tridecyl alcohol is a poly-branched chain primary aliphatic alcohol prepared from tetrapropylene by the oxo process and on conversion to the amine with dimethylamine becomes a poly-branched chain tertiary amine of the formula $C_{12}H_{25}$ —$CH_2$—N—$(CH_3)_2$. The preferred amine salt useful in this invention is N,N-dimethyltridecylamine, and this amine salt will be used in the following discussions and examples to more particularly describe the invention.

Endothal, which is 3,6-endoxohexahydrophthalic acid of the structure

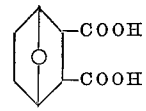

has two carboxylic acid groups and the dimethyltridecylamine salt may be used as the mono-salt or as the neutral di-salt. Thus, the monodimethyltridecylamine salt of endothal as well as the bis-dimethyltridecylamine salt of endothal are included in this invention.

The amine salts of the present invention may be made very readily simply by adding stoichiometric amounts of dimethyltridecylamine to the endothal acid in the presence or absence of a mutual solvent. In a preferred procedure all that need be done is add stoichiometric amounts of dimethyltridecylamine and the endothal acid to water, with or without a dispersing agent (such as ethylene glycol) and mix until a homogeneous solution of the salt is obtained. In lieu of an aqueous system, solvents such as aromatic hydrocarbons (e.g., benzene, toluene, xylene); esters (e.g., ethyl acetate); alcohols (e.g., ethanol); and the like may be used as the medium, the reactants being mixed in the warmed solvent and obtained as a solid precipitate on cooling. Alternatively, the reactants may be mixed at ambient or slightly elevated temperatures without a liquid medium other than the dimethyltridecylamine itself.

Examples illustrating the preparation of the dimethyltridecylamine salts follow:

Example 1

2.5 lbs. of endothal acid (80% active ingredient), 2.57 lbs. of dimethyltridecylamine (95% active ingredient), and 3.33 lbs. of water are mixed and stirred until a homogeneous solution is obtained. The resulting product is an aqueous solution of the mono-dimethyltridecylamine salt of endothal, which solution contains the equivalent of 2 lbs. per gallon of endothal acid.

Example 2

Two pounds of endothal acid (80% active ingredient), 4.1 lbs. of dimethyltridecylamine (95% active ingredient), 1.25 lbs. water, and 0.75 lb. of ethylene glycol (as dispersant) are mixed until a homogeneous solution is obtained. This product is the neutral bis-dimethyltridecylamine salt of endothal (i.e. the diamine salt) and the aqueous formulation contains 1.6 lbs. per gallon of endothal acid equivalent.

The above amine salts are extremely effective herbicides, particularly as pre-emergent herbicides, for control of weeds and to kill undesired vegetation. The salts may be used at extremely low concentrations ranging from 3 to 100 pounds per acre and preferably the concentration used will be in the range of 3 to 15 lbs. per acre. Lower rates can be used which will stunt the weed growth without affecting the crop. Compositions employing dimethyl-tridecylamine or its salts may be formulated as water solutions with or without a suitable wetting agent which would aid in penetration of plant and soil surfaces. They may also be made more readily water soluble by the addition of water soluble solvents such as ethylene glycol, diacetone alcohol, methanol, ethanol, etc. which aids the rapid preparation of aqueous solutions.

Compositions may also be prepared as emulsion concentrates for dilution in water for field applications. These may be prepared by the use of suitable solvents such as xylene, heavy aromatic naphtha, and isophorone with the addition of suitable emulsifying agents which are usually blends of various compounds having the proper ratios of oil and water solubility properties and which are stable in the presence of the compound.

Wettable powders may be prepared by a direct grinding of the dry compounds with a blend of a suitable dispersing agent such as attapulgite, bentonite, kieselguhr, etc. It is desirable to grind such a blend in a hammer mill so that 99% will pass through a 325 mesh screen. Wettable powders may also be prepared by absorbing a solution or dispersion of the compound in a solvent such as xylene or acetone on a clay such as attapulgite or diatomaceous earth. All wettable powder preparations should contain a dispersing agents such as lignin sulfate and a wetting agent such as an alkyl aryl polyether glycol.

Any one or all of the above preparations may be used in formulating granules of 5 to 20 per cent composition of active herbicidal ingredient. The user may make application employing a granular applicator rather than a duster or sprayer and known methods in commercial use are applicable for the preparation of granular formulations.

As indicated, the compositions are particularly useful in pre-emergence weed control applications on various crops. This method of weed control with a herbicide involves the application of the chemical to the soil some time prior to the emergence of the crop. The application is most conveniently made at the same time as the seeding operation and most commonly involves the use of a sprayer attachment to the blender which applies the diluted chemical on the soil surface immediately after covering the seed. Only a band of the seed row may be treated with the herbicide or the whole area may be treated on a broadcast basis. The chemical may or may not be mixed with the first one or two inches of soil at the time of this application using a suitable rototiller type tool.

The pre-emergence herbicides as employed in this invention possess the necessary properties to be effective in field use. Ideally, it should be possible to place a chemical on the soil surface in the zone of germinating weed seeds which are usually above the zone in which the crop plant has been placed. The small weed seeds usually emerge from only the upper inch of soil. However, it is impossible under practical conditions to maintain a separation of the chemical and the crop seed and it is, therefore, necessary for the herbicide to be of a selective type which will control as many undesirable weeds as possible without significant injury to the crop. This requires fairly unique and highly specific properties in the chemical since many of the crop plants are related botanically to weed crops occurring in the same field. The amines and their salts as described in this invention meet this requirement. Furthermore, these chemicals are resistant to degradation by various factors which are present in the soil environment; e.g., absorption by the clay ingrediance of the soil, variations in pH values, microbiological degradation, ultraviolet radiation, loss by volatilization, etc. These salts show a residual herbicidal action for a period of about three months to twelve months after treatment depending on the crop, type of soil, and the length of the growing season. This is an advantage because particularly highly stable chemicals are undesirable where the herbicidal effect would be carried into the next season on a succeeding crop which could be susceptible to the effect of the chemical. The herbicides of this invention have a wide spectrum of weed control which is desirable because most crops can be infested with many species of both grasses and broad-leaved weeds. The pre-emergence herbicide chemicals of this invention are adopted for use on specific crop plants and show a high degree of tolerance to all varieties of the crop. This tolerance is shown on all types of soils and under various environmental conditions which can change the response of a crop to a chemical.

The compounds were evaluated for pre-emergence weed control properties by applying solutions, emulsion concentrates, or wettable powder preparations to the soil surface of flats in the greenhouse. These flats were planted prior to treatment with beets, peas, soybeans, flax, and cotton and width weed seeds of Amaranthus sp. (red root), *Chenopodium album* (lambsquarter), Portulaca sp. (purslane), Setaria sp. (foxtail), and Digitaria sp. (crabgrass), etc. Application of the chemical was made immediately after planting of the crop and weeds. The flats were then placed under suitable conditions in the greenhouse and counts made of crop and weed emergence after a three to four-week period. The flats are usually held for a second count in order to observe secondary effects on the growing plants and to further evaluate the residual weed control.

The following tables indicate the results of pre-emergent testing and compare related amine salts in order to show the outstanding effectiveness of the dimethyl-tridecylamine salts.

TABLE I.—PRE-EMERGENCE TEST

| Product | Endothal acid equivalent used per acre | Part 1—Percentage kill of woods as listed | | | | | Endothal acid equivalent used per acre | Part 2—Percentage emergence of crop as listed | | | | |
|---|---|---|---|---|---|---|---|---|---|---|---|---|
| | | Fox tail | Crab-grass | Lambs-quarter | Amar-anthus | Purslane | | Sugar beets | Cotton | Peas | Soy-beans | Flax |
| Disodium salt of Endothal | 10 lbs | 80 | 0 | 40 | 60 | 80 | 10 lbs | 100 | 80 | 90 | 70 | 0 |
| | 5 lbs | 40 | 10 | 20 | 20 | | 5 lbs | 85 | 60 | 100 | 100 | 75 |
| Neutral dimethyl-tridecylamine salt of Endothal | 5 lbs | 100 | 100 | 100 | 100 | 100 | 5 lbs | 87 | 70 | 20 | 100 | 20 |
| | 2.5 lbs | 99 | 100 | 85 | 96 | 100 | 2.5 lbs | 75 | 56 | 100 | 100 | 55 |
| Mono dimethyl-tridecylamine salt of Endothal | 5 lbs | 100 | 100 | 90 | 100 | 100 | 5 lbs | 70 | 70 | 60 | 90 | 85 |
| | 2.5 lbs | 100 | 100 | 50 | 100 | 100 | 2.5 lbs | 75 | 70 | 80 | 100 | 80 |
| Neutral soyamine salt of Endothal (see note 1) | 5 lbs | 0 | 15 | 65 | 0 | 20 | 5 lbs | 75 | 84 | 90 | 100 | 50 |
| Neutral dimethyl-soyamine salt of Endothal (see note 1) | 5 lbs | 60 | 0 | 0 | 60 | 65 | 5 lbs | 100 | 70 | 70 | 90 | 50 |
| Neutral oleylamine salt of Endothal | 5 lbs | 10 | 0 | 15 | 80 | 15 | 5 lbs | 80 | 100 | 70 | 90 | 60 |
| Neutral dimethyl-oleylamine salt of Endothal | 5 lbs | 60 | 0 | 0 | 0 | 0 | 5 lbs | 90 | 100 | 80 | 90 | 60 |
| Neutral dimethyl-cocoamine salt of Endothal (see note 2) | 5 lbs | 95 | 50 | 0 | 100 | 80 | 5 lbs | 85 | 60 | 100 | 100 | 75 |
| | 2.5 lbs | 82 | 0 | 0 | 60 | 45 | 2.5 lbs | 100 | 98 | 90 | 80 | 80 |

NOTE 1: Soyamine is composed of amines having a chain length distribution of approximately 84% C-18 and 16% C-16.
NOTE 2: Cocoamine is composed of amines having a chain length distribution corresponding to 49% C-12, 17% C-14, 9% C-16, 10% C-18, the balance being C-10 and C-8 amines.

In another testing procedure weed control on corn, wheat, and peas was evaluated by measuring the reduction of weeds formed when the planted area was treated pre-emergently with several herbicidally active agents at a rate of 3 pounds per acre. Table II shows the results:

TABLE II

| Agent tested | Percent reduction of weeds over control with no herbicide |
|---|---|
| CH$_3$<br>\N—R<br>CH$_3$ | |
| R=C$_{12}$ (straight) dimethylcocoamine salt of Endothal | 79.0 |
| R=C$_{13}$ (branched) dimethyltridecylamine salt of Endothal | 92.4 |
| R=C$_{14}$ (straight) dimethyltetradecylamine salt of Endothal | 73.9 |

As can be seen from the above tables, the weed control with the dimethyltridecylamine salts of endothal is exceptionally good and surprisingly superior to the disodium salt of endothal and other long chain amine salts of endothal. It is also evident from part 2 of Table II that the emergence of crops treated with the herbicides of this invention is quite high thus showing the good tolerance of crops to the dimethyltridecylamine salts of herbicidal acids. Instead of using dimethyltridecylamine, diethyltridecylamine, di-isopropyltridecylamine, di-tertiary butyl tridecylamine may be used with essentially equivalent results.

The above description of the invention and the examples have shown the operability of dialkyltridecylamine salts as the growth affecting agents, but it is to be understood that these agents may be used also in admixture with other known plant growth affecting compounds.

We claim:
1. A water soluble compound of the formula

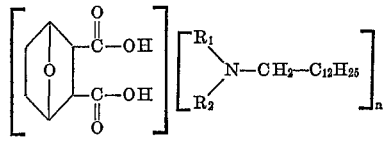

where $R_1$ and $R_2$ are lower alkyl groups and where the $C_{12}H_{25}$ moiety of the amine is branched, said amine being derived from a tridecyl alcohol made by the Oxo process from tetrapropylene, and where $n$ is the integer 1 or 2.

2. A compound of claim 1 where $R_1$ and $R_2$ are methyl.
3. A compound as in claim 2 where $n$ is 1.
4. A compound as in claim 2 where $n$ is 2.

References Cited

UNITED STATES PATENTS

| 3,178,277 | 4/1965 | Reck et al. | 260—346.2 |
| 3,207,593 | 9/1965 | Lindaberry | 260—346.2 |

ALEX MAZEL, Primary Examiner

B. I. DENTZ, Assistant Examiner

U.S. Cl. X.R.

71—88